United States Patent [19]

Bakal et al.

[11] Patent Number: 5,346,716
[45] Date of Patent: Sep. 13, 1994

[54] LOW CALORIE LOW FAT BUTTER-LIKE SPREAD

[75] Inventors: Abraham I. Bakal, Parsippany; Penny A. Cash, Denville, both of N.J.; Marvin E. Eisenstadt, Neponsit, N.Y.

[73] Assignee: Cumberland Packing Corp., Brooklyn, N.Y.

[21] Appl. No.: 936,935

[22] Filed: Aug. 28, 1992

[51] Int. Cl.$^5$ .............................................. A23D 7/04
[52] U.S. Cl. ..................................... 426/603; 426/604; 426/804
[58] Field of Search ................. 426/602, 603, 804, 604

[56] References Cited

U.S. PATENT DOCUMENTS

| | | | |
|---|---|---|---|
| Re. 30,096 | 8/1979 | Carlile et al. | 426/603 |
| Re. 31,754 | 12/1984 | Miller et al. | 426/602 |
| 3,962,465 | 6/1976 | Richter et al. | 426/48 |
| 3,986,890 | 10/1976 | Richter et al. | 127/38 |
| 4,091,121 | 5/1978 | Hawley | 426/603 |
| 4,103,037 | 6/1978 | Bodor et al. | 426/575 |
| 4,160,850 | 7/1979 | Hallstrom et al. | 426/601 |
| 4,238,520 | 12/1980 | Miller et al. | 426/573 |
| 4,273,795 | 1/1981 | Bosco et al. | 426/602 |
| 4,292,333 | 9/1981 | Bosco et al. | 426/335 |
| 4,307,125 | 12/1981 | Guelph | 426/604 |
| 4,308,294 | 12/1981 | Rispoli et al. | 426/564 |
| 4,414,229 | 11/1983 | Bakal et al. | 426/98 |
| 4,510,166 | 4/1985 | Lenchin et al. | 426/565 |
| 4,536,408 | 8/1985 | Morehouse et al. | 426/250 |
| 4,587,131 | 5/1986 | Bodor et al. | 426/603 |
| 4,849,243 | 7/1989 | Streenivasan et al. | 426/602 |
| 4,865,867 | 9/1989 | Platt et al. | 426/603 |
| 4,869,919 | 9/1989 | Lowery | 426/604 |
| 4,917,915 | 4/1990 | Cain et al. | 426/573 |
| 4,956,193 | 9/1990 | Cain et al. | 426/573 |
| 4,978,554 | 12/1990 | Larsson et al. | 426/604 |
| 4,981,709 | 1/1991 | Furcsik et al. | 426/565 |
| 4,990,355 | 2/1991 | Gupta et al. | 426/602 |

OTHER PUBLICATIONS

Agriculture Handbook No. 8, "Composition of Foods", U.S. Dept. of Agriculture (1975).
Code of Federal Regulations, 21 CFR 166,100.

*Primary Examiner*—Carolyn Paden
*Attorney, Agent, or Firm*—Steinberg, Raskin & Davidson

[57] ABSTRACT

A spread is provided which is butter-like in its consistency (and of course therefore margarine-like) but which is low in fat and is either low in or substantially free of cholesterol, so that the spread can be used for spreading on bread and the like. In addition, the spread is suitable for frying. The spread comprises a combination of low fat and natural starches in particular combination and proportions.

18 Claims, No Drawings

LOW CALORIE LOW FAT BUTTER-LIKE SPREAD

BACKGROUND OF THE INVENTION

According to FDA regulations, butter and margarine must contain at least 80% fat. The fat in butter is derived from milk and thus has a high content of saturated fats and contains significant amounts of cholesterol. A 100 gram portion of butter contains 250 mg of cholesterol, 81 g of fat and 716 calories (Composition of Foods, Agriculture Handbook No. 8, USDA, 1975).

Margarine is usually produced from an emulsion of oils and fats derived from vegetables. In accordance with the regulations set forth in the standard of identity section of the Federal Food, Drug and Cosmetic Act, 21 CFR 116,110, margarine should contain the same fat content as butter. However, most margarines are cholesterol-free because the fat is derived from vegetables.

Health organizations and medical experts have been recommending that consumers reduce their fat intake as well as their cholesterol intake. The Surgeon General of the USA, in a 1988 report, recommended that consumers should reduce their fat, especially saturated fats, and cholesterol intake. The Surgeon General also recommended the maintenance of desirable weight through caloric control. Butter and margarine are both significant sources of fat and calories. Butter is also a significant source of cholesterol.

Attempts were made to reduce the fat content of margarine-like spreads. These diet margarines typically contain 40% fat or more. The most successful products in the market have about 60% fat. Some of the commercial products include a 48% vegetable oil spread with 40% less fat and calories than margarine. Also available is 60% fat spread and several brands of 40% fat spreads. It is interesting to note that the low fat spreads prominently state "not recommended for baking or frying".

In general it is known, to those familiar with the art, that these lower fat, reduced calorie spreads do not meet consumer expectations in that they are not stable, and in that the fat and caloric reductions are not sufficient. In addition, since butter and margarine are used not only as spreads, but also for frying, these low fat products exhibit an unacceptable level of spattering when used on frying pans. Indeed, as set forth above, most low calorie spreads clearly state that the product is not suitable for cooking or frying.

The patent literature describes many approaches to overcoming these problems and/or to producing better products. Bakal, et al. in U.S. Pat. No. 4,414,229 describes an approach to overcoming the artificial flavor problem associated with margarine and low-calorie spreads.

Hawley in U.S. Pat. No. 4,091,121 describes a process for making a reduced fat spread which contains about 28% fat and 4% soy protein isolate. Voorburg, et al., U.S. Pat. No. 4,103,037, describes a low fat spread using gelatin and other proteinaceous substances as the gelling agent and a process for making an emulsion containing 40% fat. Thus, this product has approximately 370 calories per 100 grams. U.S. Pat. No. 4,849,243 describes a high the use of gelatin as a thickening agent for preparing a low fat spread. Bosco, et al., U.S. Pat. No. 4,273,795, describes a low-fat spread containing between 10-30% fat and emulsion stabilizer and an emulsifier systems. The stabilizers are of the gum type such as microcrystalline cellulose and carboxymethyl cellulose.

Lenchin, et al. in U.S. Pat. No. 4,510,166 describes the use of converted starches as fat or oil replacers. The patent describes the use of these materials, which are derived from tapioca, corn or potato starch, in margarine-like spreads. The patent states "In the 53% fat margarine the fry, blandness and color was not as good, in the 30% fat margarine the fry was not equivalent but the product was considered acceptable." It is thus clear that the use of these materials was not regarded as successfully meeting consumer needs. U.S. Pat. No. 4,869,919 describes a composition for a spread containing between 44 and 55% fat and a low level of low D.E. maltodextrin.

U.S. Pat. No. Re 30,086 describes the use of palm oil in spreads. U.S. Pat. No. 4,238,520 describes a low fat spread using cellulose ether as a thickening agent. U.S. Pat. No. 4,160,850 describes a shelf stable mix for making spreadable butter substitutes consisting of an emulsifier, hard fat and oil.

U.S. Pat. No. 4,536,408 describes a composition of low fat spreads having a fat content of 15–35% by weight utilizing a low D.E. non-gelling starch hydrolyzate with a D.E. of about 4 but not more than 25%. The amount of this low D.E. starch hydrolyzate is about 25% by weight in a 20% fat spread. Although the spread of this patent is described as having the mouthfeel and taste of higher fat spreads, it cannot be used for frying in the same manner as higher fat spreads due to the use of the non-gelled starch hydrolysate. Still further, the use of the non-gelled starch hydrolysate limits the shelf-life of the product because it is not possible to fill containers with the product while the product is hot since gelling would occur.

Other patents of interest are U.S. Pat. No. 4,587,131 which uses starch which remains in the spread as "granules in the crystalline state". Cain, et al. U.S. Pat. No. 4,917,915 teaches the use of a gel-forming composition having a high viscosity of at least 20 mPa (preferably much higher) at 5° C. and at a shear rate of 17090 sec$^{-1}$. This is achieved through the use of gelling gums such as carrageenan, hydrolyzed potato starch, gelatin and combinations thereof. U.S. Pat. No. 4,956,193 of Cain, et al. teaches the use of gel-forming compositions comprising two gelling agent such as gelatin, carrageenan, etc. on the one hand and a gelling starch and denatured soy protein.

All of the above patents teach that the use of starch alone at non-gelling concentrations will not yield acceptable, stable, water-in-oil emulsion-type spreads.

SUMMARY OF THE INVENTION

It is accordingly a primary object of the present invention to provide highly acceptable, very low fat spreads in the form of spreads and sticks, utilizing non-hydrolyzed starch.

It is another object of the present invention to provide a stable, butter-like spread which is low in fat, which is low in or free of cholesterol and which can also be used for frying with minimum or no spattering. This spread is butter-like or margarine-like in consistency.

It is the further object of the present invention to provide butter-like or margarine-like spreads which have a fat content of not more than 30% by weight.

It is yet another object of the present invention to provide a microbiologically stable product which can be marketed either under refrigeration or without refrigeration for a minimum period of 120 days.

It is yet a further object of the present invention to produce very low fat margarine-like products in the form of sticks which can be used to replace regular margarines in baking and cooking.

Other objects and advantages of the present invention will be apparent from a further reading of the specification and of the appended claims.

With the above and other objects in view, the present invention mainly comprises a combination of natural starches alone or in combination to provide a stable spread.

In accordance with the present invention, the product contains between about 5 and 30% by weight, and preferably between 10 and 25% by weight of fat, between 50 and 80% by weight of water, preferably between 55–80% by weight, and one or more natural starches in a total amount of between 0.5 and 5% by weight and preferably between 0.5 and 3% by weight.

Starches or combinations thereof from such sources as corn, potato, rice, barley and oats can be used for the purposes of the present invention. The most preferred starches are those derived from rice, oats and combinations thereof, because these natural starch have the desired creamy mouthfeel and spreadability characteristics.

Natural starch derived from rice or from oats is preferably used in an amount of 0.5–5% by weight, and most preferably in an amount of 0.5–3% by weight of the final product.

It is well recognized by those familiar with the art that the type of fat used has an effect on the spreadability and other performance characteristics of the spread. This invention permits the use of margarine oils with typical solid fat index (SFI) in the following range:
- at 50° F.—11–25
- at 70° F.—6–16
- at 92° F.—1.0–4 and preferably in the range of:
- at 50° F.—11–16
- at 70° F.—6–12
- at 92° F.—1–3

It is also possible to formulate a specific oil through the mixing of soybean oil with soybean flakes as shown in the examples.

The use of fats having the SFI profile mentioned above assures the presence of low percentage of saturated fats. In addition, this insures meltability, spreadability at refrigerator temperatures of about 40° F. and excellent mouthfeel devoid of the waxy texture in fat with higher melting points.

It should be noted that the use of high melting point fats for producing low fat spreads has been practiced such as in the Moorehouse U.S. Pat. No. 4,536,919 and in a commercially available product marketed under the brand name "Heart Beat". However, as previously mentioned, these products are waxy and do not exhibit acceptable melting properties.

In addition, the compositions of the invention can include emulsifiers, preferably mono- and di-glycerides and/or lecithin, as well as flavors (natural and/or artificial) and gums or thickeners such as carrageenan or sodium alginate to improve the stability of the emulsion.

In order to improve the microbial stability, acid is added (e.g. phosphoric acid, lactic acid, citric acid, etc.), to bring the product to a pH of less than 4.5 and preferably between about 4.0 and 4.4. The product is then produced using regular margarine processing techniques, except that the aqueous portion must be heated to about 160°–180° F. in order to gelatinize the starch. Alternatively, pregelatinized starches can be used instead of the "cook-up" types.

As indicated, one of the advantages of the present invention is that the product thereof not only spreads like butter or margarine, but can also be used for frying without spattering, this despite the low fat content and despite the water content. Furthermore, the product can be produced in the form of margarine sticks and used in baked goods and other baking and cooking applications replacing margarine or butter in regular recipes.

While the invention is not meant to be limited to any theory as to how this reduction and spattering during frying is accomplished, the following theory is given in the hope that it will help others to carry out further investigations in this art.

It is believed that when the product of the invention is used for frying, the starches form a film in and around the water so that the water does not splatter, but rather evaporates slowly. The film remains on the frying pan so that the fried material, such as an egg, slides on the film as it would on ordinary butter.

Another advantage of the present invention is that the finished product can be kept frozen without breaking the water-in-oil emulsion. Most low fat spreads cannot maintain emulsion integrity during freezing.

DESCRIPTION OF PREFERRED EMBODIMENTS

The following examples are given to further illustrate the present invention. The scope of the invention is not, however, meant to be limited to the specific details of the examples. In the examples, all parts are by weight.

EXAMPLE 1

A fat phase was prepared comprised of 19.0 parts of partially hydrogenated fat (ADM 701), and 1.0 part of mono- and di-glycerides. The fat phase was heated to melt the oil and mixed to produce a uniform liquid.

The dry ingredients consisting of 2.0 parts of rice starch (Remyline AC), 2.0 parts of dehydrated natural butter flavor, 1.5 parts of salt, 0.1 parts of sodium benzoate and 0.1 parts of potassium sorbate, were dry blended. The dry ingredients were added to 75.80 parts of water with mixing and heat to about 170° F. The fat and water phases were combined and lactic acid was added to bring the mass to pH 4.4. The mix was then passed through a cooling scraped surface heat exchanger and a water-in-oil emulsion was formed and packed into tubs.

The resulting product had excellent spreadability, flavor and mouthfeel and is stable under refrigeration for over 180 days. This product contains 19% fat by weight, no cholesterol and less than 200 calories per 100 grams. For comparison, commercially available diet margarines contain 40% fat and 360 calories per 100 g. Regular margarine contains 80% fat and 720 calories per 100 g.

EXAMPLE 2

Another product was produced using the following composition:

The fat phase consisted of 11 parts of liquid oil, 8 parts of partially hydrogenated soybean flakes, 0.8 parts of mono- and di-glycerides and 0.1 parts of fat soluble butter flavor. This phase was heated to melt the hard fat and to produce a uniform liquid.

The aqueous phase consisted of 2 parts of rice starch, 1.2 parts of salt, 0.8 parts of latic acid 88%, and 0.2 parts of equal weight blends of sodium benzoate and potassium sorbate. These dry ingredients were added to 75.9 parts of water. This phase was heated to 180° F. to gelatinze the starch.

The water phase was added to the oil phase and mixed to form a water-in-oil emulsion. The emulsion was cooled with a scraped surface heat exchanger and filled in tubs. The product was similar in quality to the one described in Example 1.

EXAMPLE 3

Approximately 14 g of the product described in Example 2 was added to a frying pan. The pan was heated to melt the butter-like or margarine-like spread. No spattering or foaming occurred. The pan was used to fry an egg and no sticking was observed.

This behavior is totally unexpected because of the high moisture and the low fat content.

The product of Example 2 was also added to hot foods such as vegetables. Melting properties were excellent and similar to butter and margarine. The product also had excellent spreadability and butter flavor.

EXAMPLE 4

The product of Example 2 of the invention was evaluated against butter and a commercial diet margarine using 40 naive consumers on a scale of 1=dislike extremely; 5=neutral; and 9=like extremely. The results are summarized below:

|  | Butter | Diet Margarine* | Example 2 |
|---|---|---|---|
| Overall | 7.2 | 6.7 | 6.5 |
| Appearance | 7.2 | 6.8 | 6.8 |
| Texture/mouthfeel | 7.3 | 6.7 | 6.6 |
| Flavor | 7.3 | 6.6 | 6.2 |

*This commercial diet margarine contained 40% fat.

EXAMPLE 5

Low fat margarine sticks were prepared using the following composition:

The fat phase consisted of 8 parts of liquid soybean oil, 10 parts of soybean flakes, 1.5 parts of oil soluble butter flavor and 1.4 parts of mono- and di-glycerides. This phase was heated to melt the oil and to produce a uniform liquid.

The water phase consisted of 2 parts rice starch, 1.2 parts salt, 0.2 parts of a blend of equal weights of potassium sorbate and sodium benzoate, 0.1 part of water soluble butter flavor and 75.6 parts of water. This water phase was heated to about 180° F. to gelatinize the starch.

The water phase was added to the fat phase while mixing and a water-in-oil emulsion formed. This emulsion was cooled using a scraped surface heat exchanger, formed into sticks and wrapped.

The resulting product contained 18% fat and about 185 calories per 100 g. The product is very stable, can be stored under refrigeration for about six months, and can be used in the same manner as full fat margarines. It was used successfully to replace margarine in standard recipes for brownies, butter cookies, cakes and the like.

While the invention has been described with respect to particular combinations of components, it is apparent that variations and modifications of the invention can be made without departing from the spirit or scope thereof.

What is claimed is:

1. A low calorie, low fat spread, having the consistency and spreadability of butter, and being suitable for frying, said spread consisting essentially of between about 5–30% by weight of a fat, between about 50–85% by weight of water, and between about 0.5–5% by weight of gelatinized natural starch.

2. Spread according to claim 1 and having a pH of less than 4.5.

3. Spread according to claim 2 and having a pH between about 4.0 and 4.4.

4. Spread according to claim 1, the pH of said spread being adjusted by phosphoric, lactic or citric acid.

5. Spread according to claim 1 and also including an emulsifier.

6. Spread according to claim 1 and also including a thickener.

7. Spread according to claim 1, wherein the fat content is between about 10–25% by weight.

8. Spread according to claim 7, wherein the water content is between about 55–80% by weight.

9. Spread according to claim 8, wherein said gelatinized natural starch is present in amount of between about 0.5–5% by weight.

10. Spread according to claim 1, wherein said gelatinized natural starch is corn, potato, rice, barley or oat starch, or a mixture of at least two such starches.

11. Spread according to claim 1, wherein said gelatinized natural starch is rice starch or oat starch.

12. Spread according to claim 11, wherein said gelatinized natural starch is present in an amount of 0.5–3% by weight.

13. Spread according to claim 1, wherein said fat is butter.

14. Spread according to claim 1, wherein said fat is of vegetable origin.

15. Spread according to claim 1, wherein said starch is a mixture of rice starch and oat starch.

16. Method of producing a low calorie, low fat spread, having the consistency and spreadability of butter, and being suitable for frying, said spread consisting essentially of between about 5–30% by weight of fat, between about 50–85% by weight of water and between about 0.5–5% by weight of natural starch, which comprises forming a fat phase containing said fat, forming a dry phase containing said starch, mixing said dry phase with said water and heating the same to gelatinize said starch, combining the thus resulting water phase with said fat phase, and pasteurizing and homogenizing the resulting mixture to form said spread wherein said natural starch is gelatinized.

17. Method according to claim 16, wherein phosphoric acid, lactic acid or citric acid is added to the water to adjust the pH to less than 4.5.

18. Method according to claim 17, wherein the pH is adjusted to between about 4.0 and 4.4.

\* \* \* \* \*